United States Patent
Goodsitt et al.

(10) Patent No.: US 10,452,902 B1
(45) Date of Patent: Oct. 22, 2019

(54) PATENT APPLICATION IMAGE GENERATION SYSTEMS

(71) Applicant: Capital One Services, LLC, McLean, VA (US)

(72) Inventors: Jeremy Edward Goodsitt, McLean, VA (US); Austin Walters, McLean, VA (US); Anh Truong, McLean, VA (US); Vincent Pham, McLean, VA (US); Fardin Abdi Taghi Abad, Seattle, WA (US); Mark Watson, Urbana, IL (US); Reza Farivar, McLean, VA (US); Kenneth Taylor, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/395,139

(22) Filed: Apr. 25, 2019

Related U.S. Application Data

(60) Provisional application No. 62/784,107, filed on Dec. 21, 2018.

(51) Int. Cl.
| | |
|---|---|
| G06K 9/00 | (2006.01) |
| G06F 16/93 | (2019.01) |
| G06Q 50/18 | (2012.01) |
| G06T 11/20 | (2006.01) |
| G06N 3/08 | (2006.01) |

(52) U.S. Cl.
CPC ......... G06K 9/00456 (2013.01); G06F 16/93 (2019.01); G06N 3/08 (2013.01); G06Q 50/184 (2013.01); G06T 11/206 (2013.01); G06F 2216/11 (2013.01)

(58) Field of Classification Search
CPC ........ G06N 20/00; G06N 3/0454; G06N 3/08; G06F 17/27; G06K 9/6262
See application file for complete search history.

(56) References Cited

U.S. PATENT DOCUMENTS

| | | | |
|---|---|---|---|
| 9,754,206 B1 | 9/2017 | Brestoff | |
| 10,210,861 B1* | 2/2019 | Arel | ........................ G10L 13/00 |
| 2003/0159128 A1* | 8/2003 | Kunzler | .................... G06F 8/20 |
| | | | 717/109 |

(Continued)

OTHER PUBLICATIONS

Ghosh, Arnab, et al. "Contextual RNN-GANs for abstract reasoning diagram generation." arXiv preprint arXiv:1609.09444 (2016). (Year: 2016).*

(Continued)

*Primary Examiner* — Li Liu
(74) *Attorney, Agent, or Firm* — Troutman Sanders LLP; Christopher J. Forstner; John A. Morrissett

(57) ABSTRACT

A system configured to receive a draft patent specification, provide the draft patent specification to a first neural network (NN), classify, using the first NN, paragraphs of the draft patent specification, provide the one or more paragraphs to a second NN, generate, via the second NN, one or more logical components based on the one or more paragraphs, provide the one or more logical components to a generative adversarial network (GAN), generate, via the GAN, a plurality of image components based on the one or more logical components, provide the plurality of image components to a computing device for modification.

20 Claims, 6 Drawing Sheets

(56) References Cited

U.S. PATENT DOCUMENTS

| | | | |
|---|---|---|---|
| 2011/0046944 | A1 | 2/2011 | Sparks |
| 2014/0025608 | A1 | 1/2014 | Miller et al. |
| 2014/0229158 | A1 | 8/2014 | Zweig et al. |
| 2017/0200076 | A1 | 7/2017 | Vinyals et al. |
| 2018/0144188 | A1 | 5/2018 | Evanitsky |
| 2018/0190249 | A1* | 7/2018 | Roblek ............... G10H 1/0025 |
| 2018/0239507 | A1 | 8/2018 | Bui et al. |
| 2018/0373979 | A1* | 12/2018 | Wang ................ G06K 9/00664 |

OTHER PUBLICATIONS

Salvaris, Mathew, Danielle Dean, and Wee Hyong Tok. "Generative Adversarial Networks." Deep Learning with Azure. Apress, Berkeley, CA, 2018. 187-208. (Year: 2018).*

Yanagi, Rintaro, et al. "Image Retrieval from Vague Description Based on AttnGAN." 2018 IEEE 7th Global Conference on Consumer Electronics (GCCE). IEEE, 2018. (Year: 2018).*

Jaques, N.—Tuning Recurrent Neural Networks with Reinforcement Learning; Nov. 9, 2016; https://magenta.tensorflow.org/2016/11/09/tuning-recurrent-networks-with-reinforcement-learning.

Drissi, Y. et al.—PatentAI: IP Infringement Detection with Enhanced Paraphrase Identification; Dec. 5, 2018; https://neurips.cc/Conferences/2018/Schedule?showEvent=12177.

Auli, M., et al.—A novel approach to neural machine translation; May 9, 2017; https://code.fb.com/ml-applications/a-novel-approach-to-neural-machine-translation/.

Shankar, T., et al.—Reinforcement Learning via Recurrent Convolutional Neural Networks; Jan. 9, 2017; https://arxiv.org/abs/1701.02392.

Wikipedia, Garbled Circuit, https://en.wikipedia.org/wiki/Garbled_circuit (as of Apr. 18, 2019).

Wikipedia, Secure Multi-party Computation, https://en.wikipedia.org/wiki/Secure_multi-party_computation (as of Nov. 18, 2018).

Yehuda Lindell, Bar-Ilan University Winter School on Secure Computation and Efficiency, Session 2: The Yao Construction and its Proof of Security (2011), https://www.youtube.com/watch?v=mtKCDJe4a48 (last visited Dec. 18, 2018).

Mike Rosulek, Oregon State University, Securing Computation: A Brief History of Practical Garbled Circuit Optimizations (2015), https://www.youtube.com/watch?v=FTxh908u9y8 (last visited Dec. 18, 2018).

Kudo, T., et al.—Japanese Dependency Analysis using Cascaded Chunking, proceedings of the 6th conference on Natural language learning Aug. 31, 2002; http://www.aclweb.org/anthology/W02-2016.

Ward M. D., Markov Models for Text Analysis, Labs for 2011 Summer School, http://www.stat.purdue.edu/~mdw/CSOI/MarkovLab.html (Summer 2011).

Chablani, M., "Sequence to sequence model: Introduction and concepts," Jun. 22, 2017.

Huang, X. et al., "Stacked Generative Adversarial Networks," Apr. 12, 2017.

Joglekar, S., "Image convertor," Jan. 27, 2018.

Xu, T. et al., "AttnGAN: Fine-Grained Text to Image Generation with Attentional Generative Adversarial Networks," Nov. 28, 2017.

* cited by examiner

PATENT APPLICATION IMAGE GENERATION SYSTEMS

CROSS REFERENCE TO RELATED APPLICATION(S)

This application claims priority to U.S. Provisional Patent Application No. 62/784,107, filed on Dec. 21, 2018, which is incorporated herein by reference in its entirety.

FIELD OF INVENTION

The present disclosure relates to systems and methods for generating patent images, and more particularly to systems and methods using a neural network (NN) and a generative adversarial network (GAN) to generate patent image components that are then combined to generate a patent image.

BACKGROUND

Patent images or drawings are core parts of a patent application. Together with the written description they can convey possession of an invention as well as support the claims defining the metes and bounds of the invention. However, the generation of patent drawings or patent images is very time consuming and therefore costly. Often, multiple revisions are needed as the text of the patent specification changes or as claim language changes.

Accordingly, there is a need for systems and methods for quickly and accurately generating patent drawings. Embodiments of the present disclosure are directed to this and other considerations.

SUMMARY

Disclosed embodiments provide systems and methods using one or more NN and a GAN to generate patent image components.

Consistent with the disclosed embodiments, various methods and systems are disclosed. In an embodiment, a method for generating a patent image. The method may be implemented with a computing device. The method may include receiving a draft specification. The method may include providing the draft patent specification to a first trained NN. The method may include classifying, using the first NN, paragraphs of the draft patent specification. The method may include selecting one or more classified paragraphs of the draft patent specification. The method may also include providing the selected one or more paragraphs to a second NN. The method may also include generating, via the second trained NN, one or more logical components based on the selected one or more paragraphs. The method may also include providing the one or more logical components to a GAN (e.g., an Attention GAN). The method may also include generating, via the GAN, a plurality of image components based on the one or more logical components. The method may also include providing the plurality of image components to a user device. The method may optionally include receiving user modification input comprising at least one modification to the at least one of the plurality of image components.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
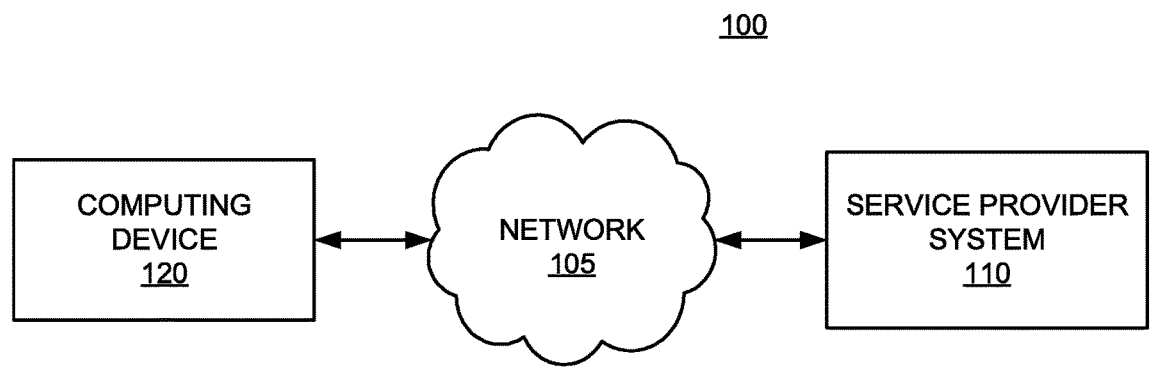
FIG. 1 is a diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

This disclosure discusses using a NN to generate one or more logical components that are fed into a GAN to generate one or more patent images components that are stitched together to form a patent image. It is envisioned that NN could be a recurrent neural network (RNN), a convolutional neural network (CNN), or a convolutional recurrent neural network (CRNN). In addition, the GAN may be an attentional generative adversarial network (AttnGAN), which can synthetize fine-grained details at different subregions of an image by paying attention to the relevant words in the text description, or a stack GAN, which is a top-down stack of GANs each learned to generate a lower-level representation conditioned on higher-level representations. Moreover, in an alternative embodiment, it is envisioned that the GAN could be eliminated when generating flowcharts. The second sequence-to-sequence NN (e.g., RNN) could generate logical component that are easily assembled into flowcharts.

The type of NN used could be a classification NN, which may classify a paragraph of text. Another type of NN that could be uses is a sequence-to-sequence NN, which may generate logical components based off of paragraphs of text.

The present disclosure is directed to methods and systems for generating a patent image using one or more NNs and a GAN, and, in particular, for utilizing the one or more NNs to generate logical components, from text of a draft patent application, which are provided to a GAN to generate one or more patent image components. In some embodiments, a method may include receiving a first portion of a draft patent specification having one or more paragraphs. A first NN may classify at least a first paragraph of the first portion. The includes providing the classified first paragraph to a second NN, which generates one or more logical components based on the classified first paragraph. The one or more logical components are then provided to a GAN, which generates a plurality of image components based on the one or more logical components. The method includes forming a first patent image from the plurality of image components.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a service provider system 110 in communication with a computing device 120 via network 105. In some embodiments, service provider system 110 may also be in communication with various databases. Computing device 120 may be a user device such as a mobile computing device (e.g., a smart phone, tablet computer, smart wearable device, portable laptop computer, voice command device, wearable augmented reality device, or other mobile computing device) or a stationary device (e.g., desktop computer).

In some embodiments, the computing device 120 may transmit a draft patent application to the service provider system 110, and the service provider system 110 may utilize one or more NNs to classify and generate logical components from one or more paragraphs of the draft patent application. In addition, the service provider system 110 may utilize a GAN to generate one or more patent image components from the logical components and then stitch the patent image components together. In some embodiments, the service provider system 110 may control the computing device 120 to implement one or more aspects of the NN(s) and the GAN.

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
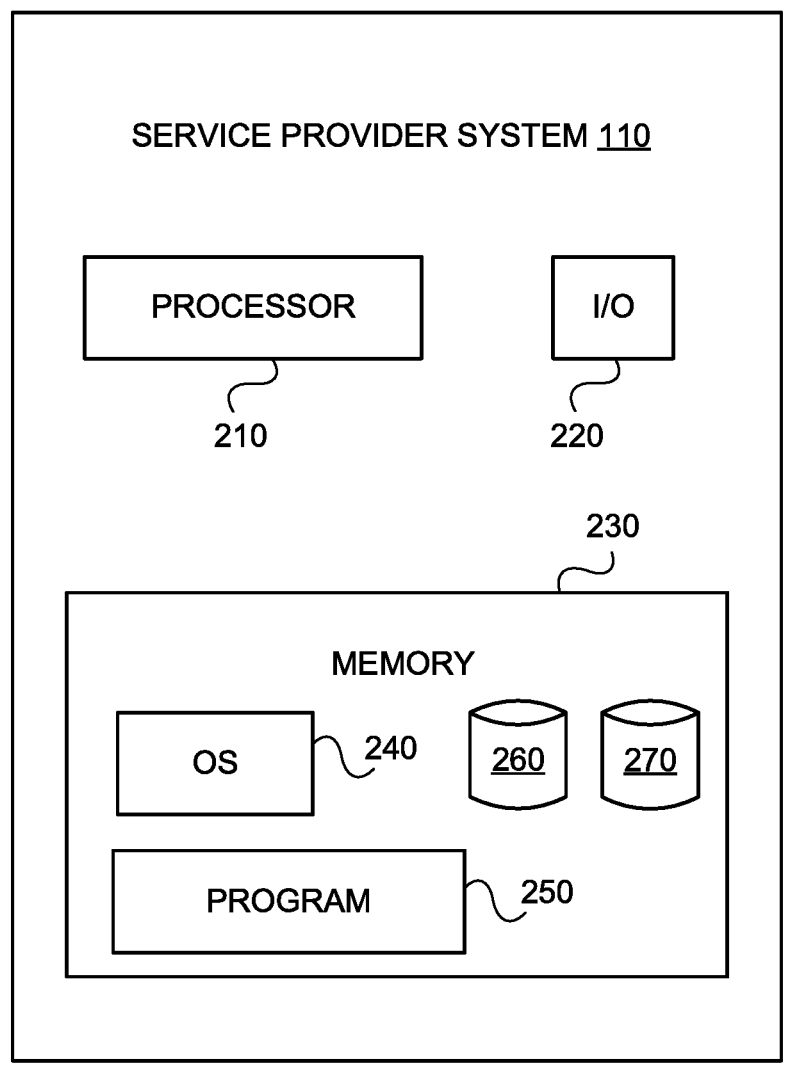
FIG. 2 is a component diagram of a service provider system according to an example embodiment.

An example embodiment of service provider system 110 is shown in more detail in FIG. 2. Computing device 120 may have a similar structure and components that are similar to those described with respect to service provider system 110. As shown, service provider system 110 may include a processor 210, an input/output ("I/O") device 220, a memory 230 containing an operating system ("OS") 240 and a program 250. For example, service provider system 110 may be a single server or may be configured as a distributed computer system including multiple servers or computers that interoperate to perform one or more of the processes and functionalities associated with the disclosed embodiments. In some embodiments, service provider system 110 may further include a peripheral interface, a transceiver, a mobile network interface in communication with processor 210, a bus configured to facilitate communication between the various components of the service provider system 110, and a power source configured to power one or more components of service provider system 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider system 110 may configured to remotely communicate with one or more other devices, such as computer device 120. According to some embodiments, service provider system 110 may utilize an NN to translate one or more legal clauses from legalese to plain English.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 110 may include one or more storage devices configured to store information used by processor 210 (or other components) to perform certain functions related to the disclosed embodiments. In one example, service provider system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider system 110 may include memory 230 that may include one or more programs 250 to perform one or more functions of the disclosed embodiments. Moreover, processor 210 may execute one or more programs 250 located remotely from service provider system 110. For example, service provider system 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider system 110 to perform one or more of the processes and functionalities associated with the disclosed embodiments.

Service provider system 110 may also be communicatively connected to one or more memory devices (e.g., databases (not shown)) locally or through a network. The remote memory devices may be configured to store information and may be accessed and/or managed by service provider system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 110 may also include one or more I/O devices 220 that may include one or more interfaces for receiving signals or input from devices and providing signals or output to one or more devices that allow data to be received and/or transmitted by service provider system 110. For example, service provider system 110 may include interface components, which may provide interfaces to one or more input devices, such as one or more keyboards, mouse devices, touch screens, track pads, trackballs, scroll wheels, digital cameras, microphones, sensors, and the like, that enable service provider system 110 to receive data from one or more users (such as via computing device 120).

In example embodiments of the disclosed technology, service provider system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
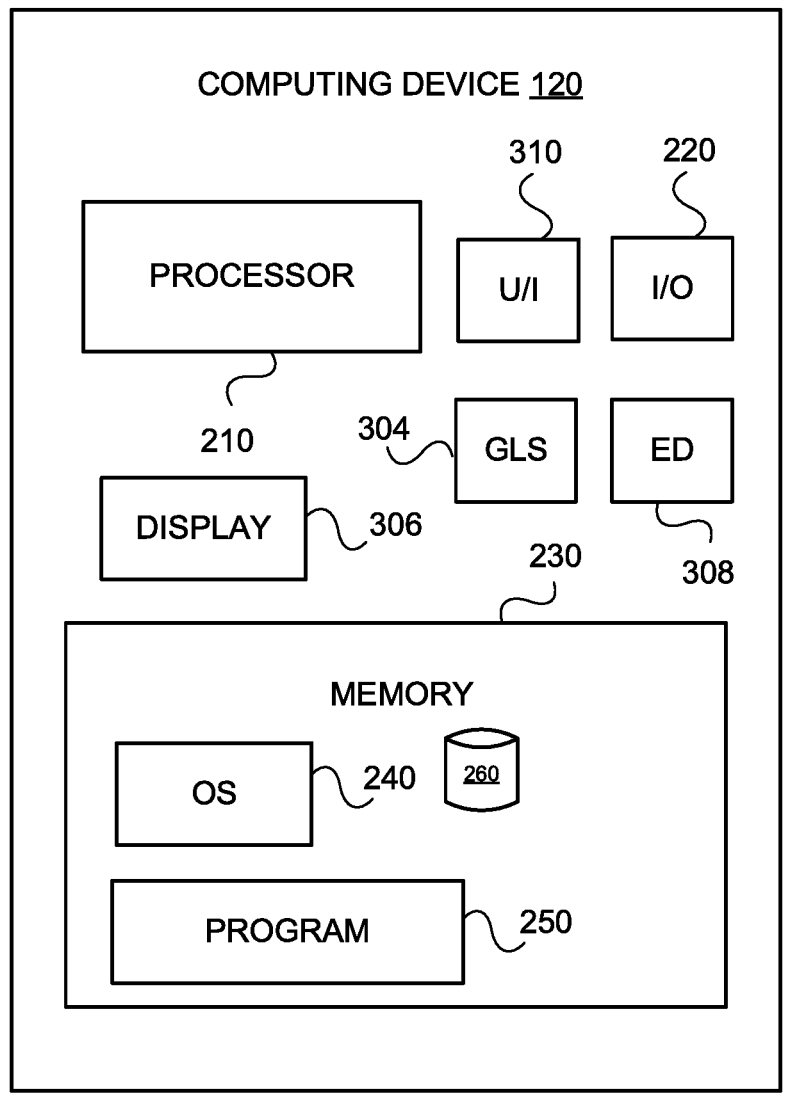
FIG. 3 is a component diagram of a computing device according to an example embodiment.

FIG. 3 shows an example embodiment of computing device 120. As shown, computing device 120 may include input/output ("I/O") device 220 for receiving data from another device (e.g., service provider system 110), memory 230 containing operating system ("OS") 240, program 250, and any other associated component as described above with respect to service provider system 110. Computing device 120 may also have one or more processors 210, a geographic location sensor ("GLS") 304 for determining the geographic location of computing device 120, a display 306 for displaying content such as text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Figure 4:
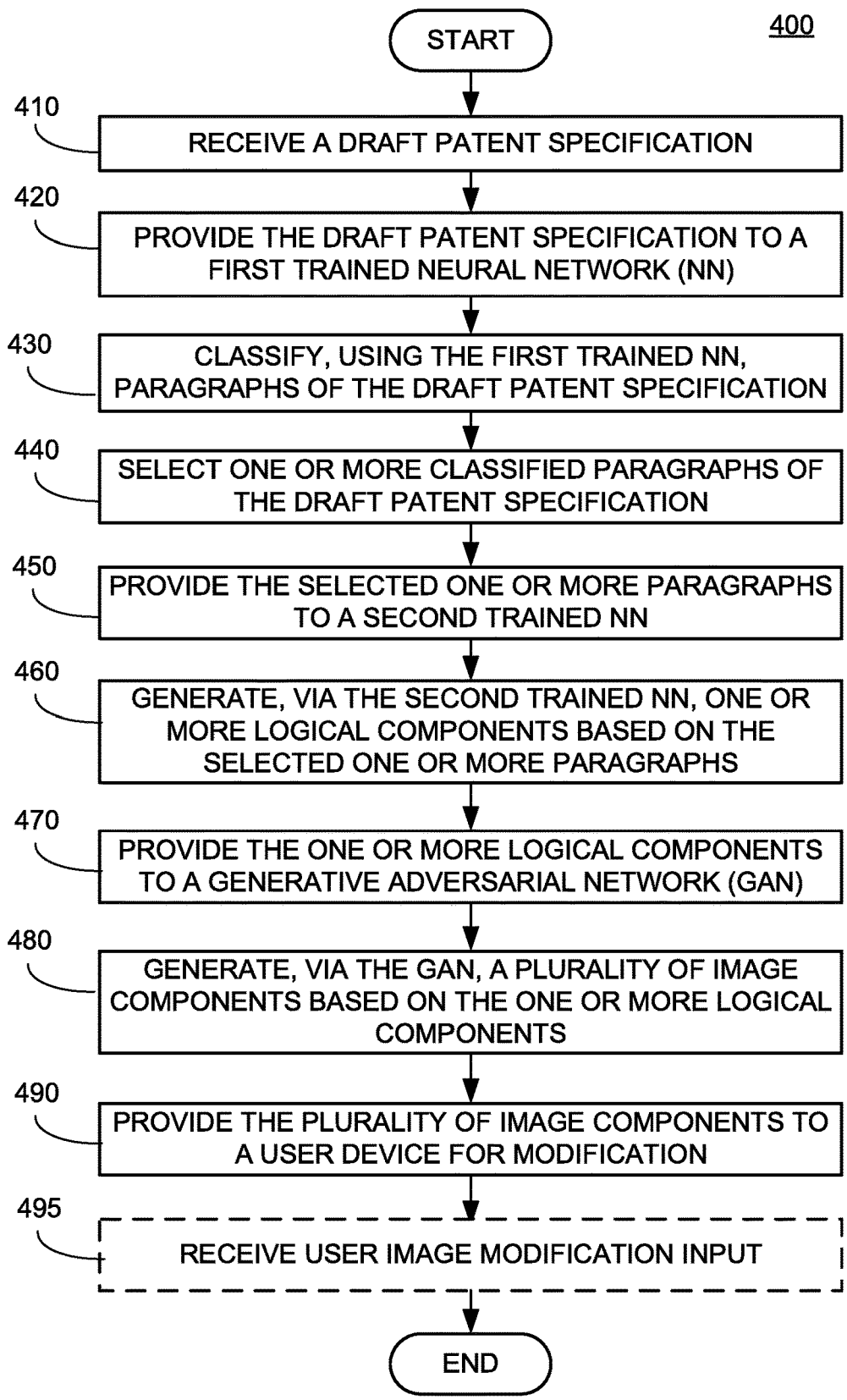
FIG. 4 is a flowchart of a method for generating a patent drawing or image according to an example embodiment.

FIG. 4 shows a flowchart of a method 400 for generating a patent image. Method 400 may be performed by the service provider system 110 and/or the computing device 120 of the system 100.

In block 410, the system (e.g., system 100) may receive a draft patent specification. The draft patent specification may include a detailed description section which may include descriptions related to patent images. For example, the draft patent specification may include descriptions related to method flow chart. These descriptions may include phrases such as "[i]n block 410," "[i]n step 410" or "step 410" that correspond to the description of method step. In some embodiments, the draft patent specification may include descriptions of a method flow chart without the number associated with the block and without the words "block" or "step." For example, the draft specification may include a process step such as "the system may receive a draft patent specification" or "the system may provide the draft specification to a first trained NN for processing." As another example, the draft patent specification may describe a device such as an engine. The draft patent specification may broadly mention or describe an engine or describe specific details about the engine (e.g., a V6 car engine equipped with a turbocharger). As a further example, the draft patent specification may describe an engine as having various components such as an engine block with cylinders, pistons, a water pump, an oil pan, an intake manifold, an exhaust manifold, and belts. As a further example, the draft patent specification may describe a system such as one or more servers and other computing devices connected to one another.

In block 420, the system (e.g., system 100) may provide the draft patent specification to a first trained NN for processing. The first trained NN may be a classification NN trained to classify paragraphs of patent specifications.

The first NN may be trained using training data, such as, for example, pre-classified paragraphs from published patent applications or issued patents. For example, a user may take a published patent application and classify the paragraphs as part of a method (e.g., a series of events), system, device, etc. This classification and the corresponding paragraph(s) are fed to the first NN. In some embodiments, the user may also identify trigger words or phrases either in the entire patent application or patent or only within paragraphs of a specified classification. For example, the user may classify certain paragraphs as relating to a flowchart shown in FIG. 1 and identify "block," "process," or "step" followed by one or more digits (e.g., block 410, block 420, step 430, etc.) as a trigger phrase signaling a new step in the flowchart. In another example, the user may classify certain paragraphs as relating to a system diagram of system 100 shown in FIG. 1 and identify similarly numbered components (e.g., devices 102 and 104, terminal 110, sub-system 120, network 130, etc. having similar numbers to system 100) as trigger words signaling a component for each new number to be added into the system diagram. In a further example, the user may classify certain paragraphs as relating to a diagram of an assembled part 100 (e.g., an engine, a mobile device, etc.) shown in FIG. 1 and identify similarly numbered components (e.g., component 102, component 110, subassembly 120, etc. having similar numbers to part 100) as trigger words signaling a component for each new number to be added into the assembled part diagram. In some embodiments of such examples, the training data may include figures showing both an assembled and exploded-part views of the assemble part, and providing this more comprehensive data to the first NN may configure to more accurately render components of the assembled part. After many iterations, the classification NN is ready for accepting an input. In this manner, the first NN may be modularly trained such that it is configured to process one or more of flowcharts, system diagrams, and specific parts or mechanical assemblies. It is contemplated that the first NN may be trained for processing multiple types of patent figures or only a single type (e.g., flowcharts) and, optionally, used in conjunction with another NN trained for processing another type of patent figures (e.g., system diagrams). This type of training is performed prior to the block 410 and to create a workable classification NN.

In block 430, the system (e.g., system 100) may classify, using the first trained NN, one or more paragraphs of the received draft patent specification. In some cases, the service provider system 110 performs the classification. In other cases, the computing device 120 performs classification. As an example, the service provider system 110 may, via the first trained NN (or a CNN), classify one or more paragraphs (e.g., by number or by phrase as paragraphs starting with one of the following "the system may receive a draft patent specification," "the system may provide the draft patent specification to a first trained NN for processing," or "the system classifies, using the first trained NN, paragraphs of the draft patent specification") as method paragraphs associated with method steps of a flow chart. As an alternative example, service provider system 110 may, via the first trained NN, classify one or more paragraphs as system paragraphs (e.g., by number as paragraphs or by phrase as a paragraph starting with "system may include a service provider system in communication with a computing device via network"). As a further example, the service provider system 110 may, via the first trained NN, classify one or more paragraphs as device paragraphs describing a device or other apparatus, such as an engine. For example, the device paragraphs may include a paragraph that describes the components of an engine such as "the engine includes an engine block with cylinders, pistons, a water pump, an oil pan, an intake manifold, an exhaust manifold, and belts." The first trained NN may classify one or more paragraphs by the type of image or figure that is to be generated by the GAN (e.g., flowchart, computer diagram, mobile diagram, system diagram, architectural design, or other device diagram). Additionally, the first trained NN may also classify by utilizing an optimal NN architecture for breaking down the logical components.

In block 440, the system (e.g., system 100) may select one or more classified paragraphs of the draft specification. In some cases, the service provider system 110 selects the one or more classified paragraphs. In other cases, the computing device 120, at the direction of a user using computing device 120, performs the selection and the service provider system 110 receives the selection from the computing device 120. As an example, the system may select the paragraphs classified as a method and not select paragraphs classified as another type (e.g., system). The system may select paragraphs of a first classification (e.g., method) in a first processing step and select paragraphs of a second classification (e.g., system) in a second processing step.

In block 450, the system (e.g., system 100) may provide the selected one or more paragraphs to a second trained NN. In some embodiments, the second trained NN may be a sequence-to-sequence NN. In other embodiments, the second trained NN may be a recurrent neural network (RNN), a convolutional neural network (CNN), or a convolutional recurrent neural network (CRNN). In further embodiments, the RNN may be a sequence-to-sequence RNN. A sequence-to-sequence RNN is an RNN that converts an input sequence to an output sequence. The sequence-to-sequence RNN may encode the classified paragraphs to ultimately decode them into logical components. If the second trained NN includes multiple trained NNs of different types (e.g., a RNN, a CNN, and/or a CRNN), the system may identify a type of NN based on the classification of the selected paragraph(s) and provide the selected paragraph(s) to the NN of the identified type. In embodiments where the system makes multiple selections (e.g., a first selection of paragraphs of the first classification and a second selection of paragraphs of a second classification) to be processed separately, the system may identify a type of NN based on the classification of the selected paragraph(s) in each selection and provide the selected paragraph(s) to the NN of the identified type for each selection (e.g., provide the first selection to a trained RNN because the corresponding paragraphs were classified as a method and the second selection to a trained CRNN because the corresponding paragraphs were classified as a system).

In block 460, the system (e.g., system 100) may generate, via the second trained NN, one or more logical components based on the selected one or more paragraphs. The logical component corresponds to one or more clauses in a document. A block (or step) of a flowchart may include a combination of clauses of a document. Similarly, one feature (e.g., a spark plug) of a device (e.g., an engine) may correspond to one or more clauses of a document. In some embodiments, the system (e.g., system 100) may, via the second trained NN, also generate a directed graph, provided there are dependencies between the logical components. Generating the directed graph means generating arrows (e.g., arrows in system diagrams and flow charts) between the logical components. When the classification of the paragraph(s) is a method, the logical components may be similar to the text of the paragraph(s) but broken into individual blocks of a flowchart. When the classification of the paragraph(s) is a system, the logical components may be components of a system such as the processor, memory, input/output, etc. of a computing device such as a server or a mobile device. When the classification of the paragraph(s) is a device, the logical components may correspond to the components of a device (e.g., an engine) with each logical component corresponding with the components of the device (e.g., an engine block with cylinders, pistons, a water pump, an oil pan, an intake manifold, and belts).

In block 470, the system (e.g., system 100) may provide the one or more logical components to a GAN. The GAN, which may be an attentional generative adversarial network (AttnGAN) or a stack-GAN (SGAN), includes a generator network that generates image components from text (or in this case logical components from the second trained NN) and a discriminator network that detects fake data fabricated from the generator network. Both the generator network and the discriminator network may be trained. The discriminator network may be trained on patent drawings (e.g., diagrams or flowcharts) from the vast number of publicly available US patents and US patent application publications. The discriminator network then trains the generator network to be able to produce the patent drawings. For example, the discriminator network detects and determines whether an image component generated from the generator network looks fake or low quality (e.g., pixelated). If the discriminator network detects that an image component is fake or low quality, the image component is discarded. However, if the discriminator network detects that an image component is high quality, then the discriminator network releases the generated image or image component. Thus, the discriminator network (trained on a corpus of published US patents and US patent applications) essentially trains the generator network to generate high quality patent image components.

In block 480, the system (e.g., system 100) may generate, via the GAN, a plurality of image components based on the one or more logical components. For example, the plurality of image components may be a plurality of blocks of a flowchart. As another example, the plurality of image components may correspond to components of a system diagram (e.g., multiple devices or subsystems in communication with one another over a network or multiple networks). As another example, the plurality of image components may correspond to components of a device diagram of a computer showing a processor component, a memory component, etc. As another example, where the image is device such as an engine, the plurality of image components may correspond to the components of the engine (e.g., an engine block with cylinders, pistons, etc., a water pump, an oil pan, an intake manifold, an exhaust manifold, and belts.). As a further example, the plurality of image components may correspond to components of a user interface drawing where one component is an onscreen keyboard on a mobile device and another component is an onscreen icon.

In some embodiments, the system (e.g., system 100) may generate, via the GAN, a plurality of image components in an exportable file format so that a user can modify (e.g., resize, reposition, rotate, or change a layer status) the plurality of image components. Each of the plurality of image components may include image component labels including a number and a line (e.g., a curved line) connecting the number to a corresponding image component. As an example, the system may, via the GAN and based on training data and the logical components, generate a technical drawing file (e.g., a Visio™ file (.vsdx)) containing the plurality of image components for the user to modify.

If the plurality of image components are boxes of a flowchart containing text with arrows connecting the flowchart boxes, a user could access or download the technical drawing file, rephrase the text, rotate the text and/or boxes in the flowchart, reposition the boxes in the flowchart (which may involve rearranging the order of the boxes and/or their connecting arrows), resize the boxes in the flowchart, and/or change a layer of a particular box so it is moved in front of or behind another box or object in the flowchart. Additionally or alternatively, the exported file may be configured such that the user could add or remove arrows connecting flow chart boxes or add or remove flow chart boxes. Additionally or alternatively, the exported file may be configured such that the user could change the number associated with the image component label or rotate, reposition, resize, or change a layer status of the number or the line connecting the number to the corresponding image component.

If the plurality of image components corresponds to components of a device such as an engine, then the system (e.g., system 100) may generate, via the GAN and based on training data and the logical components, an exploded-view diagram with engine components such as an engine block with cylinders, pistons, a water pump, an oil pan, an intake manifold, an exhaust manifold, and belts in a technical drawing file. The exploded-view diagram may be provided in such a manner (e.g., via a user interface and display in communication with the GAN or via an exported file configured for editing within another program such as Visio™) that the user could edit (e.g., rotate, reposition, resize, or change the layer status (e.g., move the exhaust manifold in front of or behind another image component)) of the image components in the technical drawing file. Additionally or alternatively, the user interface and/or exported file may be configured such that the user could change the number associated with the image component label or rotate, reposition, resize, or change a layer status of the number or the line connecting the number to the corresponding image component (e.g., the exhaust manifold). In this manner, the GAN may generate the exploded-view diagram containing separate engine components (e.g., cylinders, pistons, etc.), which may then be user-assembled to form an assembled part (e.g., the assembled engine).

If the plurality of image components corresponds to components of a system diagram (e.g., FIG. 1), the system (e.g., system 100) may generate, via the GAN and based on training data and the logical components, a technical drawing file containing the image components such as a computing device, a network, and a service provider system with arrows connecting the computing device to the network and the service provider system to the network. A user may file and rotate, reposition, resize, or rearrange the computing device, the network, and the service in the technical drawing file. Additionally or alternatively, the user could rephrase the text associated with the computing device, the network, and the service provider system. Additionally or alternatively, the user could change the number associated with the image component label or rotate, reposition, resize, or change a layer status of the number or the line connecting the number to the corresponding image component (e.g., the computing device).

In block 490, the system (e.g., system 100) may provide the plurality of image components to a user device for modification and use. The service provider system 110 may transmit to a computing device 120 via network 105 a technical drawing file (e.g., a Visio™ file) with the plurality of image components. For example, the service provider system 110 may automatically email, text, or instant message a technical drawing file to a user account associated with computing device 120 once it is generated. As another example, may access a website associated with the service provider system 110 which allows the computing device 120 to download a generated file. As another example, the computing device 120 may have a software application installed that connects to the service provider system 110 that receives (or automatically downloads) the technical drawing file once it is generated.

As discussed above, once the user receives the technical drawing file including the plurality of image components, a user, via computing device 120, may file and rotate, reposition, resize, or rearrange (including changing layer properties of) the plurality of image components in the technical drawing file. Additionally or alternatively, the user could rephrase the text associated with the plurality of image components. Additionally or alternatively, the user could change the number associated with the image component label or rotate, reposition, resize, or change a layer status of the number or the line connecting the number to the corresponding image component.

In optional block 495, the system (e.g., system 100) may receive user image modification input comprising at least one modification to at least one of the plurality of image components. The modification may include changing the text associated with one of the plurality of image components, resizing at least one of the plurality of image components, rotating at least one of the plurality of image components, repositioning at least one of the plurality of image components, and changing a layer status of at least one of the plurality of image components, or some combination thereof. The modification may also include changing the number (e.g., from "220" to "330") of the image component label. The modification may further include rotating, repositioning, resizing, or changing a layer status (e.g., bringing the line forward) of the number or the line connecting the number to the corresponding image component. As an example, the system may receive, via the network 105 and from the user's computing device 120, a technical drawing file (e.g., a Visio™ file) including the generated plurality of image component with at least one image component modified. Once the system receives the modified plurality of image components (e.g., a modified V6 engine incorporating the user's changes), the system adds the modified plurality of image components to its training data. Specifically, the system may add the modified plurality of image components (e.g., the received technical drawing file) to the discriminator network training data. Subsequently when the system receives a new paragraph reciting identical or similar assembled parts as the original text (e.g., for a V6 engine), the system may provide the stored modified plurality of image components (e.g., the modified V6 engine incorporating the user's prior changes) alone or in combination with other components as indicated by the remaining text in the new paragraph.

Figure 5:
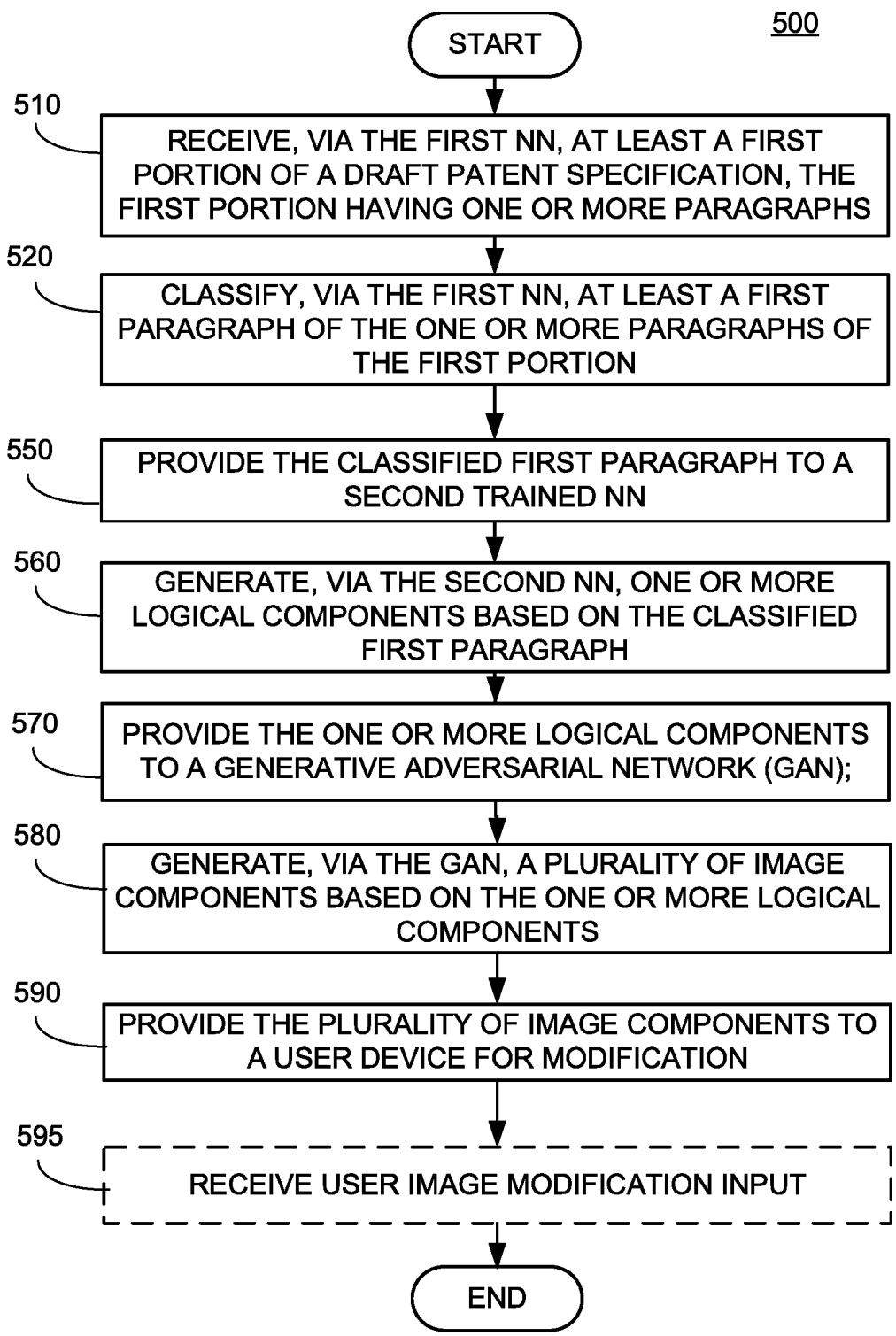
FIG. 5 is a flowchart of a method for generating a patent drawing or image according to an example embodiment.

FIG. 5 shows a flowchart of a method 500 for generating a patent image. Method 500 may be performed by the service provider system 110 and/or the computing device 120 of the system 100. Method 500 is similar to method 400 except, that method 500 involves receiving a portion of a draft patent specification rather than a full draft patent specification and the system does may not necessarily select one or more classified paragraphs. Blocks 520, 550, 560, 570, 580, 590, and 595 are similar to blocks 420, 450, 460, 470, 480, 490, and 495 and the description are blocks 420, 450, 460, 470, 480, 490, and 495 are incorporated herein by reference. Due to the similarities with method 400 and for brevity, steps of method 500 are briefly described below.

In block 510, the system receives via a first NN, at least a portion of a draft patent specification, the first portion having one or more paragraphs. The one or more paragraphs may be from the detailed description of the draft patent specification. The one or more paragraphs may correspond to a figure description for the draft patent specification. For example, the one or more paragraphs may correspond to a description of a flow chart.

In block 520, the system classifies, via the first NN, a least a first paragraph of the one or more paragraphs of the first portion. In block 550, the system provides the classified first paragraph to a second trained NN. In block 560, the system generates, via the second trained NN, one or more logical components based on the classified first paragraph. In block 570, the system provides the one or more logical components to a GAN. In block 580, the system generates, via the GAN, a plurality of image components based on the one or more logical components. In block 590, the system provides the plurality of image components to a user device. In optional block, 595, the system may receive user image modification input comprising at least one modification to at least one of the plurality of image components.

Figure 6:
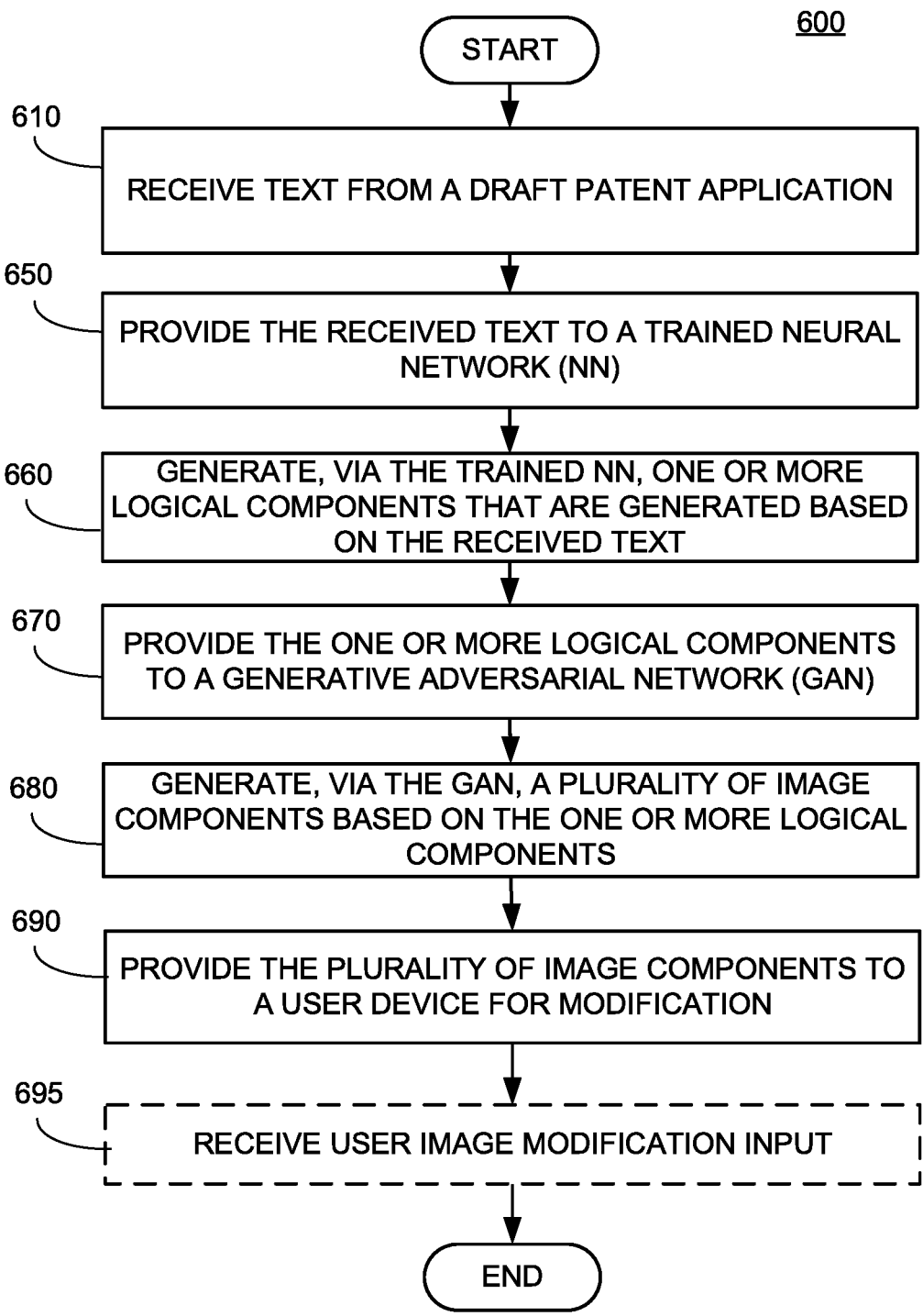
FIG. 6 is a flowchart of a method for generating a patent drawing or image according to an example embodiment.

FIG. 6 shows a flowchart of a method 600 for generating a patent image. Method 600 may be performed by the service provider system 110 and/or the computing device 120 of the system 100. Method 600 is similar to method 400 except, that method 600 involves receiving a text from a draft patent specification and involves one trained neural network (e.g., a sequence-to-sequence RNN) rather than two trained neural networks (e.g., a classifier RNN and a sequence-to-sequence RNN). Doing so may reduce the computation required to run the models and would require less pre-training. However, there may be a decrease in the quality of images being generated by the GAN since the classifying step is being omitted.

Blocks 650, 660, 670, 680, 690, and 695 are similar to blocks 450, 460, 470, 480, 490, and 495 and the description are blocks 450, 460, 470, 480, 490, and 495 are incorporated herein by reference. Due to the similarities with method 400 and for brevity, steps of method 600 are briefly described below.

In block 610, the system receives text from a draft patent application. The text may correspond to a patent figure description in the detailed description section of the draft patent application.

In block 650, the system provides the received text to a trained NN (e.g., a sequence-to-sequence RNN). In block 660, the system generates, via the trained NN, one or more logical components based on the received text. In block 670, the system provides the one or more logical components to a GAN. In block 680, the system generates, via the GAN, a plurality of image components based on the one or more logical components. In block 690, the system provides the plurality of image components to a user device. In optional block, 695, the system may receive user image modification input comprising at least one modification to at least one of the plurality of image components.

Certain implementations provide the advantage of translating a legal clause from legalese to plain English. Thus, making legal clauses and legal documents more understandable.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of a typical use of a patent image from text of a draft patent application. They are intended solely for explanatory purposes and not in limitation. In one example, a user creates a draft patent specification on their portable laptop computer (e.g., computing device 120). A user may, via a website accessed on their portable laptop computer (e.g., computing device 120), send the draft patent specification to the service provider system 110 for processing. The service provider system 110 then provides the draft patent specification to a first RNN, which in turn classifies paragraphs of the draft patent specification. For example, the service provider system 110, via the first RNN, may classify one or more paragraphs with the text describing a method as method paragraphs. The service provider system 110 then selects one or more classified paragraphs of the draft patent specification such as the method paragraphs. The service provider system 110 then provides the selected one or more paragraphs (method paragraphs) to a second RNN. The service provider system 110, generates, via the second RNN, one or more logical components based the method paragraphs. The service provider system 110 provides the one or more logical components to an AttnGAN. The service provider system 110, generates, via the AttnGAN, a plurality of image components based on the one or more logical components. The AttnGAN may generate a technical drawing file (e.g., a Visio™ file) that includes the image components, which may be method blocks with text corresponding to the method paragraphs. The service provider system 110 then provides the plurality of image components to the user's portable laptop computer (e.g., computing device 120) by emailing the user the technical drawing file. The user may, via the portable laptop computer (e.g., computing device 120) modify the one or more of the plurality of image components. For example, the user may, via computing device 120, reposition one or more of the method blocks to create a flow chart from the generated method blocks. The user may, via computing device 120 and network 105, download the modified technical drawing file containing the modified plurality of image components to a website hosted by the service provider system 110. As another example, the user may email the service provider system 110 the modified technical drawing file containing the modified plurality of image components. Regardless of how the modified technical drawing file is transmitted to the service provider system 110, the receive provider system 110 may receive user image modification input (e.g., the received modified technical drawing file) and add the user modification input (e.g., the received technical drawing file) to the discriminator network training data. Next time the system receives identical or similar (e.g., exceeding a predetermined similarity threshold) text, the generated plurality of image components should more closely mirror the modified plurality of image components.

In another example, a user creates a draft patent specification on their portable laptop computer (e.g., computing device 120). The user may, via a website accessed on their portable laptop computer (e.g., computing device 120), uploads the draft patent specification to the service provider system 110 via the website for processing. The service provider system 110 then provides the draft patent specification to a first RNN, which in turn classifies paragraphs of the draft patent specification. For example, the service provider system 110, via the first RNN, may classify one or more paragraphs as device paragraphs. More specifically, the first RNN may classify one or more paragraph describing an engine having a spark plug, valves, piston, piston rings, connecting rod, crankshaft, and sump as device paragraphs. The service provider system 110 then selects one or more classified paragraphs of the draft patent specification such as the device paragraphs. The service provider system 110 then provides the selected one or more paragraphs (device paragraphs) to a second RNN. The service provider system 110, generates, via the second RNN, one or more logical components based the method paragraph. The service provider system 110 provides the one or more logical components to an AttnGAN. The service provider system 110, generates, via the AttnGAN, a plurality of image components based on the one or more logical components. The image components may be components of the device such as the spark plug, valves, piston, piston rings, connecting rod, crankshaft, and sump of an engine. The service provider system 110 may provide the plurality of image components to the user's portable laptop computer (e.g., computing device 120) by emailing the user the technical drawing file. The user may, via the portable laptop computer (e.g., computing device 120) modify the one or more of the plurality of image components. For example, the user may, via computing device 120, reposition one or more of the method blocks to create a flow chart from the generated method blocks. The user may, via computing device 120 and network 105, upload the modified technical drawing file containing the modified plurality of image components to a website hosted by the service provider system 110. As another example, the user may email the service provider system 110 the modified technical drawing file containing the modified plurality of image components. Regardless of how the modified technical drawing file is transmitted to the service provider system 110, the service provider system 110 may receive user image modification input (e.g., the received modified technical drawing file) and add the user modification input (e.g., the received technical drawing file) to the discriminator network training data. Next time the system receives the same or similar original text, the generated plurality of image components should more closely mirror the modified plurality of image components.

What is claimed is:

1. A system, comprising:
one or more processors; and
a memory in communication with the one or more processors and storing instructions that, when executed by the one or more processors, are configured to cause the system to:
receive a draft patent specification;
provide the draft patent specification to a first trained neural network (NN);
classify, using the first trained NN, paragraphs of the draft patent specification;
select one or more classified paragraphs of the draft patent specification;
provide the selected one or more paragraphs to a second trained NN;
generate, via the second trained NN, one or more logical components based on the selected one or more paragraphs;
provide the one or more logical components to a generative adversarial network (GAN);
generate, via the GAN, a plurality of image components based on the one or more logical components; and
provide the plurality of image components to a computing device for modification.

2. The system of claim 1, wherein:
the first trained NN is a recurrent neural network (RNN), a convolutional neural network (CNN), or a convolutional recurrent neural network (CRNN), and
the second trained NN is a RNN, a CNN, or a CRNN.

3. The system of claim 1, wherein the memory storing instructions that, when executed by the one or more processors, are further configured to cause the system to receive user image modification input comprising at least one modification to the at least one of the plurality of image components.

4. The system of claim 1, wherein the plurality of image components is provided to the computing device in a technical drawing file.

5. The system of claim 1, wherein the first trained NN is a recurrent neural network (RNN) and the second trained NN is a RNN.

6. The system of claim 5, wherein the first trained RNN is a classification RNN and the second trained NN is a sequence-to-sequence RNN.

7. The system of claim 1, wherein the GAN is an attentional generative adversarial network (AttnGAN).

8. The system of claim 1, wherein the plurality of image components comprises method blocks of a flow chart, device components, or system components.

9. A system, comprising:
a first trained neural network (NN);
a second trained NN;
one or more processors in communication with the first and second NNs; and
a memory in communication with the one or more processors and storing instructions that, when executed by the one or more processors, are configured to cause the system to:
receive, via the first NN, at least a first portion of a draft patent specification, the first portion having one or more paragraphs;
classify, via the first NN, at least a first paragraph of the one or more paragraphs of the first portion;
provide the classified first paragraph to the second trained NN;
generate, via the second NN, one or more logical components based on the classified first paragraph;
provide the one or more logical components to a generative adversarial network (GAN);
generate, via the GAN, a plurality of image components based on the one or more logical components; and
provide the plurality of image components to a computing device for modification.

10. The system of claim 9, wherein:
the first trained NN is a recurrent neural network (RNN), a convolutional neural network (CNN), or a convolutional recurrent neural network (CRNN); and
the second trained NN is a RNN, a CNN, or a CRNN.

11. The system of claim 9, wherein the memory storing instructions that, when executed by the one or more processors, are further configured to cause the system to receive user image modification input comprising at least one modification to the at least one of the plurality of image components.

12. The system of claim 9, wherein the plurality of image components is provided to the computing device in a technical drawing file.

13. The system of claim 9, wherein the first trained NN is a recurrent neural network (RNN) and the second trained NN is a RNN.

14. The system of claim 13, wherein the first trained RNN is a classification RNN and the second trained NN is a sequence-to-sequence RNN.

15. The system of claim 9, wherein the plurality of image components comprises method blocks of a flow chart, device components, or system components.

16. A system, comprising:
one or more processors; and
a memory in communication with the one or more processors and storing instructions that, when executed by the one or more processors, are configured to cause the system to:
receive text from a draft patent application;
provide the received text to a trained neural network (NN);
receive, from the trained NN, one or more logical components that are generated based on the received text;
provide the one or more logical components to a generative adversarial network (GAN);
receive, from the GAN, a plurality of image components that are generated based on the one or more logical components; and
provide the plurality of image components to a computing device for modification.

17. The system of claim 16, wherein the trained NN is a sequence-to-sequence recurrent neural network (RNN), a convolutional neural network (CNN), or a convolutional recurrent neural network (CRNN).

18. The system of claim 16, wherein the memory storing instructions that, when executed by the one or more processors, are further configured to cause the system to receive user image modification input comprising at least one modification to the at least one of the plurality of image components.

19. The system of claim 16, wherein the plurality of image components is provided to the computing device in a technical drawing file.

20. The system of claim 16, wherein the plurality of image components comprises method blocks of a flow chart, device components, or system components.

* * * * *